United States Patent

Yamakawa

[11] Patent Number: 4,799,747
[45] Date of Patent: Jan. 24, 1989

[54] TILT ERROR CORRECTIVE SCANNING OPTICAL SYSTEM

[75] Inventor: Kazuo Yamakawa, Osaka, Japan

[73] Assignee: Minolta Camera Kabushiki Kaisha, Osaka, Japan

[21] Appl. No.: 88,047

[22] Filed: Aug. 21, 1987

[30] Foreign Application Priority Data

Aug. 21, 1986 [JP]  Japan .................................. 61-196208

[51] Int. Cl.$^4$ ............................................. G02B 26/10
[52] U.S. Cl. ..................................... 350/6.8; 350/6.5; 350/434
[58] Field of Search .................. 350/6.5, 6.8, 434, 6.1, 350/6.6, 6.7, 6.9, 432

[56] References Cited

U.S. PATENT DOCUMENTS

| | | |
|---|---|---|
| 3,750,189 | 7/1973 | Fleischer . |
| 3,946,150 | 3/1976 | Grafton . |
| 4,209,223 | 6/1980 | Minoura .............................. 350/6.8 |
| 4,226,500 | 10/1980 | Minoura et al. ..................... 350/6.8 |
| 4,248,495 | 2/1981 | Minoura .............................. 350/6.8 |
| 4,379,612 | 4/1983 | Matsuoka et al. ................... 350/6.8 |
| 4,447,112 | 5/1984 | Matsuoka et al. ................... 350/434 |
| 4,496,209 | 1/1985 | Itoh et al. ............................ 350/434 |
| 4,523,801 | 6/1985 | Baba et al ............................ 350/6.8 |
| 4,538,895 | 9/1985 | Higgins et al. ....................... 350/6.8 |
| 4,571,021 | 2/1986 | Minoura et al. ..................... 350/6.8 |
| 4,585,296 | 4/1986 | Minoura et al. ..................... 350/434 |
| 4,639,072 | 1/1987 | Itoh et al. ............................ 350/6.8 |
| 4,674,825 | 6/1987 | Tateoka et al. ...................... 350/6.8 |

*Primary Examiner*—John K. Corbin
*Assistant Examiner*—Martin Lerner
*Attorney, Agent, or Firm*—Price, Gess & Ubell

[57] ABSTRACT

A tilt error corrective scanning optical system for a system having a deflection device for deflecting and reflecting a light beam, comprising a linear image forming optical device for causing a light beam emitted from a light source to form a linear image on the surface of the deflection device, and an image projection optical device for causing the deflected beam of the linear image to form restored image on an objective surface while maintaining constant beam scanning speed. The image projection optical device consists of a single toric lens having toric surfaces on the both sides thereof, the first toric surface faced to the deflection device is concave in both directions parallel and perpendicular to the scanning plane and the second toric surface opposite to the first toric surface is convex in the both directions.

6 Claims, 3 Drawing Sheets

TILT ERROR CORRECTIVE SCANNING OPTICAL SYSTEM

FIELD OF THE INVENTION

The present invention relates to a tilt error corrective scanning optical system for use in laser beam printers and the like, for eliminating irregularities in line scanning pitch in an auxiliary scanning direction. More particularly, the present invention relates to a tilt error corrective scanning optical system comprising a linear image forming optical device for causing a light beam emitted from a light source to form a linear image on the surface of a deflection device, and an image projection optical device for causing the deflected beam of the linear image to form a restored image on an objective surface.

BACKGROUND OF THE INVENTION

In recent years, there is an increasing demand for laser beam printers in accordance with diversification and development of office automating machines because such printers have become available with smaller sizes at lower costs and have the advantage of high speed printing. In the laser beam printer including a deflection device such as a polygonal mirror, there occur tilt errors with respect to a direction perpendicular to a scanning plane (an auxiliary scanning direction). The term "scanning plane" means a plane including a main scanning line on the scanned objective surface and the optical axis of an image projection optical device provided between the deflection device and the objective surface. The light beam deflected by the deflection device having such errors results in an image forming position on the objective surface slipped or deviated in the auxiliary scanning direction and an irregularity in the scanning line pitch.

For eliminating the irregularity mentioned above, U.S. Pat. No. 3,750,189 proposes an optical system for laser printers and the like which includes a beam shaping optical element such as a cylindrical lens for causing a light beam emitted from a light source to form a linear image on the surface of a deflection device, a beam configuring optical element such as a cylindrical lens for restoring the deflected beam into a circular form and a beam converging optical element having fθ characteristics for converging the restored beam to form an image on an objective surface at a constant scanning speed. The above-mentioned conventional system has the drawback of reduced freedom for improving distortion characteristics provided for the beam converging optical element to realize the constant scanning speed of the beam and image forming characteristics for forming images on the objective surface. In order to realize excellent distortion and image forming characteristics, it is necessary for the beam converging optical element to increase the number of lenses thereof.

U.S. Pat. No. 3,946,150 discloses a proposal for improving the foregoing conventional construction. In this construction, a beam configuring optical element such as a cylindrical lens is interposed between the converging optical element and the objective surface to be scanned. The beam configuring optical element mentioned above must be located close to the objective surface in order to produce high quality images. It is therefore necessary for the beam configuring optical element to be long in the main scanning direction, although a compact construction is desirable.

Another known construction is disclosed in U.S. Pat. No. 4,379,612 wherein an image projection optical device disposed between the deflection device and the objective surface to be scanned by the beam comprises a single spherical lens and a single lens having a toric surface. This image projection optical device has the distortion characteristics for realizing the constant speed scanning of the beam and further the function to correct the tilt errors of the deflection device in cooperation with a linear image forming optical device disposed in front of the deflection device.

Although this construction realizes a compact optical system, only a limited design freedom is provided thereby. For example, it is difficult to enlarge the field angle for increasing the scanning range of the beam while maintaining excellent distortion characteristics and an outstanding function to correct the tilt errors of the deflection device.

SUMMARY OF THE INVENTION

Accordingly, the object of the present invention is to provide a compact tilt error corrective scanning optical system which permits the field angle to be enlarged in the main scanning direction while maintaining excellent distortion characteristics and an excellent tilt error correcting function.

BRIEF DESCRIPTION OF THE DRAWINGS

These and other objects or features of the present invention will become apparent from the following description of a preferred embodiment(s) thereof taken in conjunction with the accompanying drawings, in which:

FIGS. 2A and 2B through FIGS. 3A and 3B show examples of lens arrangement in an image projection optical device of the tilt error corrective scanning optical system of the present invention, FIGS. 2A and 3A being sectional views taken in a direction parallel to the scanning plane, and FIGS. 2B and 3B being sectional views taken in a direction perpendicular to the scanning plane, FIGS. 4A and 4B through FIGS. 5A and 5B are aberration diagrams of respective embodiments according to the present invention, FIGS. 4A and 5A being the aberration diagrams in a direction parallel to the scanning plane, and FIGS. 4B and 5B being the aberration diagrams in a direction perpendicular to the scanning plane.

In the following description, like parts are designated by like reference numbers throughout the several drawings.

DETAILED DESCRIPTION OF THE PREFERRED EMBODIMENTS

Figure 1:
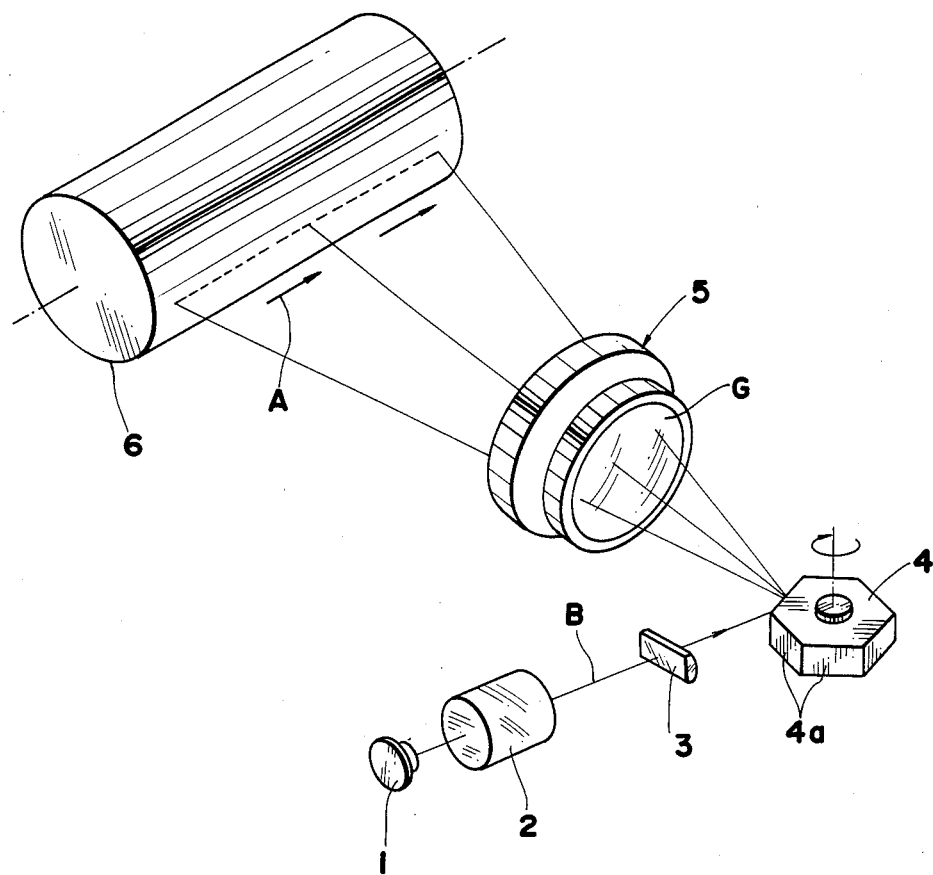
FIG. 1 is a schematic view of a laser beam printer employing a tilt error corrective scanning optical system according to the present invention.

Referring to FIG. 1, the laser beam printer, as an example embodying the present invention, comprises a semiconductor laser 1, a collimator lens 2, a cylindrical lens 3, a polygonal mirror 4, an fθ lens 5 and a photosensitive drum 6.

The semiconductor laser 1 emits a laser beam B directly modulated in accordance with image data. The laser beam B is shaped by the collimator lens 2 into a collimated beam. The beam is converged into a line by the cylindrical lens 3 on a deflection surface 4A of the polygonal mirror 4. The beam reflected and deflected by the deflection surface 4A proceeds to the drum 6 through the fθ lens 5 to scan the drum 6 in a direction indicated by reference character A in the drawing with the rotation of the polygonal mirror 4.

The fθ lens 5 has distortion characteristics for making the speed of scanning beam constant on the drum 6 and the tilt error correcting function.

The fθ lens 5 consists of a single lens G having toric surfaces on the both sides thereof. More specifically, the first toric surface faced to the polygonal mirror 4 is concave in both directions parallel and perpendicular to the scanning plane, and the second toric surface opposite to the first surface is convex in both directions parallel and perpendicular to the scanning plane, as shown in FIGS. 2A and 2B through FIGS. 3A and 3B.

The toric lens G further fulfills following conditions:

$$r_{1\nu}/r_{2\nu} \leq 1 \quad (I)$$

$$0.3 < d_1/f < 0.5 \quad (II)$$

wherein $r_{1\nu}$ and $r_{2\nu}$ are radii of curvature of the first and second toric surfaces, respectively, in the direction perpendicular to the scanning plane, $d_1$ is an axial distance between the first and second toric surface and f is the total focal length of the toric lens G in the direction parallel to the scanning plane.

The condition (I) is provided for correcting the spherical aberration and the curvature of field mainly in the direction perpendicular to the scanning plane. If the condition (I) is not fulfilled, it is difficult to balance the spherical aberration and the curvature of field in a sufficient degree while maintaining a wide field angle. Unsufficiently corrected curvature of field causes the beam to fluctuate on the scanning line, to thereby result in the deterioration of images.

The condition (II) mainly relates to the distortion characteristics provided for making the speed of beam scanning constant in the direction parallel to the scanning plane. If the lower limit of the condition (II) is violated it is difficult to maintain the distortion characteristics in a sufficient degree. On the contrary, when the upper limit of the condition (II) is violated, the lens becomes large, namely, the compactness of the lens can not achieved.

There are two embodiments of the present invention of which lens arrangements and aberration diagrams are illustrated in the drawings. Lens data of respective embodiments are shown in following tables, The relationship between the drawings and tables are listed en bloc in table 1 hereunder;

TABLE 1

Figure 2A:
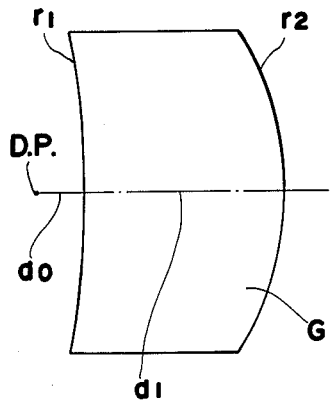
Figure 4A:
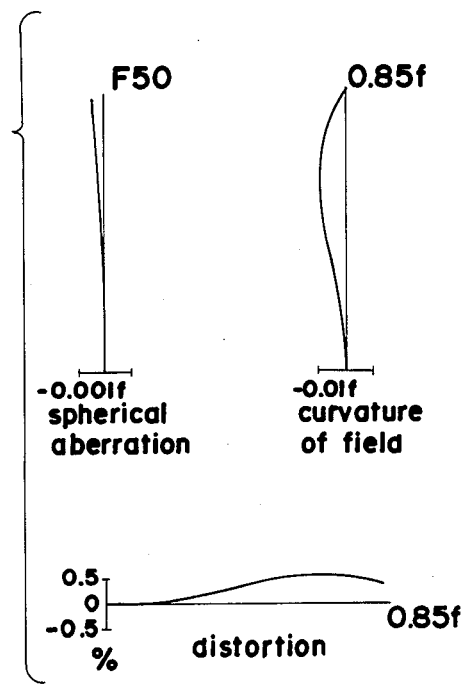
Figure 2B:
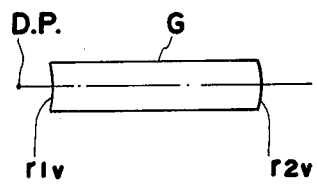
Figure 4B:
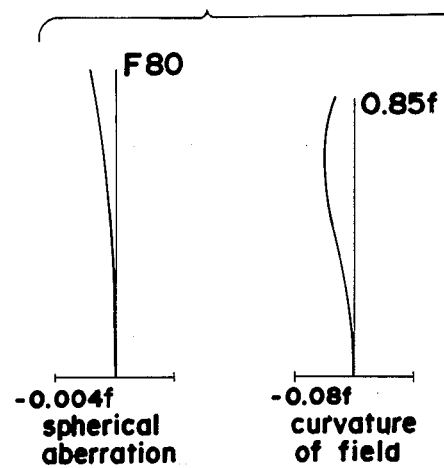
Figure 3A:
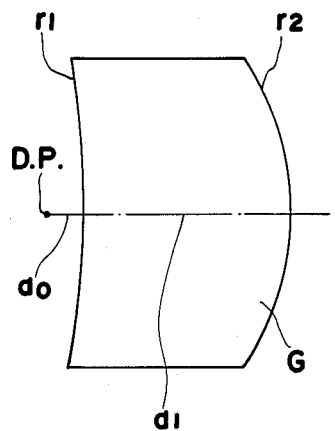
Figure 5A:
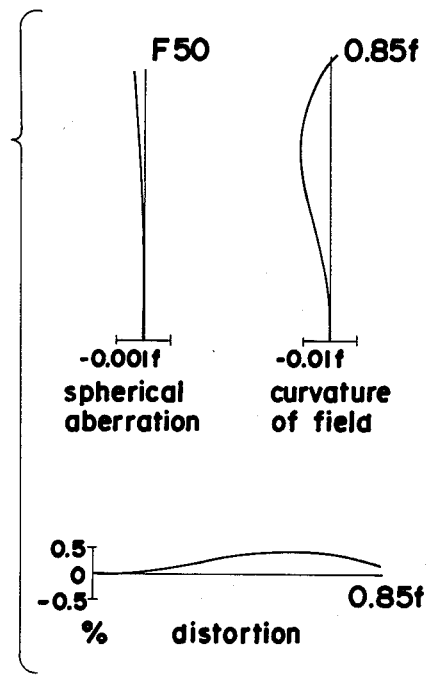
Figure 3B:
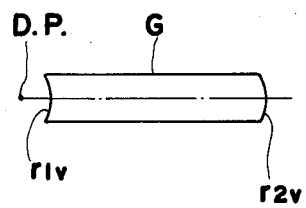
Figure 5B:
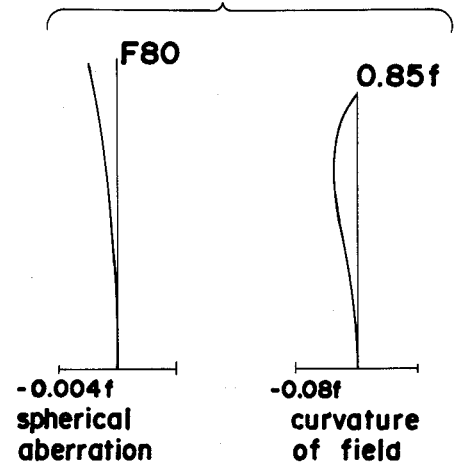

| Embodiments | Lens Arrangements | Aberrations Following Scanning Plane | Aberrations Across Scanning Plane |
|---|---|---|---|
| 1 | FIGS. 2A & 2B | FIG. 4A | FIG. 4B |
| 2 | FIGS. 3A & 3B | FIG. 5A | FIG. 5B |

In the following table showing the embodiments, 2w is a maximum incident angle and n is the refractive index of the lens G at 780 nm, and additionally shown are amounts as to the conditions (I) and (II).

In the aberration diagrams, distortions are expressed by the difference in percentage between the ideal image height fθ and actual image height y′, namely, $\{(y'-f\theta)\} \times 100$ (%).

EMBODIMENT 1
f = 125, F No. = 50, 2w = 97°

| | | Radius of Curvature | |
|---|---|---|---|
| main scan direction | aux. scan direction | Axial Distance | Refractive Index |
| Deflection Point (D.P.) | | d | n |
| | | $d_0$ 13.0 | |
| $r_1$ −224.99 | $r_{1\nu}$ −22.98 | | |
| | | $d_1$ 52.3 | 1.786 |
| $r_2$ −75.36 | $r_{2\nu}$ −23.63 | | |
| $r_{1\nu}/r_{2\nu} = 0.97$ | | $d_1/f = 0.42$ | |

EMBODIMENT 2
f = 125, F No. = 50, 2w = 97°

| | | Radius of Curvature | |
|---|---|---|---|
| main scan direction | aux. scan direction | Axial Distance | Refractive Index |
| Deflection Point (D.P.) | | d | n |
| | | $d_0$ 12.0 | |
| $r_1$ −233.23 | $r_{1\nu}$ −16.86 | | |
| | | $d_1$ 53.2 | 1.786 |
| $r_2$ −76.05 | $r_{2\nu}$ −23.23 | | |
| $r_{1\nu}/r_{2\nu} = 0.73$, $d_1/f = 0.43$ | | | |

What is claimed is

1. A tilt error corrective scanning optical system for a system having a image projection optical device for deflecting and reflecting a light beam, comprising:
    a linear image forming optical device for causing a light beam emitted from a light source to form a linear image on the surface of the deflection device; and
    an image projection optical device for causing the deflected beam of the linear image to form a restored image on an objective surface while maintaining constant beam scanning speed, the image projection optical device consisting of a single toric lens having toric surfaces on the both sides thereof, the first toric surface faced to the deflection device being concave in both directions parallel and perpendicular to the scanning plane, the second toric surface opposite to the first toric surface being convex in both directions parallel and perpendicular to the scanning plane and the lens fulfilling following conditions:

$$r_{1\nu}/r_2 \leq 1 \quad (I)$$

$$0.3 < d_1/f < 0.5 \quad (II)$$

wherein $r_{1\nu}$ and $r_{2\nu}$ are radii of curvature of the first and second toric surfaces, respectively, in the direction perpendicular to the scanning plane, $d_1$ is an axial distance between the first and second toric surfaces and f is the total focal length of the toric lens in the direction parallel to the scanning plane.

2. A tilt error corrective scanning optical system as claimed in claim 1, wherein the linear image forming optical device is a cylindrical lens.

3. A tilt error corrective scanning optical system as claimed in claim 2, wherein the deflection device is an fθ lens.

4. A tilt error corrective scanning optical system for a system having a deflection device for deflecting and reflecting a light beam, comprising:
a linear image forming optical device for causing a light beam emitted from a light source to form a linear image on the surface of the deflection device, and
a compact image projection optical device for causing the deflected beam of the linear image to form a restored image on an objective surface while maintaining a constant beam scanning speed, the image projection optical device consisting of a single toric lens having toric surfaces on both sides thereof, the first toric surface faced to the deflection device being concave in both directions parallel and perpendicular to the scanning plane with radii of curvature of both toric surfaces in the directions parallel and perpendicular to the scanning plane being different from each other, the second toric surface opposite the first toric surface being convex in both directions parallel and perpendicular to the scanning plane and the lens fulfilling the following conditions:

$$r_{1v} r_{2v} \leq 1 \qquad (I)$$

$$0.3 < d_1/f < 0.5 \qquad (II)$$

wherein $r_{1v}$ and $r_{2v}$ are radii of curvature of the first and second toric surfaces, respectively, in the direction perpendicular to the scanning plane, $d_1$ is an axial distance between the first and second toric surfaces and f is the total focal length of the toric lens in the direction parallel to the scanning plane.

5. A tilt error corrective scanning optical system as claimed in claim 4, wherein the linear image forming optical device is a cylindrical lens.

6. A tilt error corrective scanning optical system as claimed in claim 4, wherein the image projection optical device is an fθ lens.

* * * * *